United States Patent
Izawa et al.

(10) Patent No.: US 9,105,916 B2
(45) Date of Patent: Aug. 11, 2015

(54) FUEL CELL MODULE

(75) Inventors: Yasuhiro Izawa, Mishima (JP); Satoshi Shiokawa, Fuji (JP); Takashi Ono, Kirishima (JP); Mitsuhiro Nakamura, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 506 days.

(21) Appl. No.: 13/515,368

(22) PCT Filed: Dec. 15, 2010

(86) PCT No.: PCT/IB2010/003440
§ 371 (c)(1),
(2), (4) Date: Jun. 12, 2012

(87) PCT Pub. No.: WO2011/073801
PCT Pub. Date: Jun. 23, 2011

(65) Prior Publication Data
US 2012/0251904 A1 Oct. 4, 2012

(30) Foreign Application Priority Data
Dec. 15, 2009 (JP) .................. 2009-284533

(51) Int. Cl.
*H01M 8/04* (2006.01)
*H01M 2/38* (2006.01)
(Continued)

(52) U.S. Cl.
CPC ........ *H01M 8/2425* (2013.01); *H01M 8/04014* (2013.01); *H01M 8/0625* (2013.01); *H01M 8/2485* (2013.01); *H01M 8/0247* (2013.01); *H01M 8/249* (2013.01); *H01M 8/2475* (2013.01); *H01M 2008/1293* (2013.01); *Y02E 60/50* (2013.01); *Y02E 60/525* (2013.01)

(58) Field of Classification Search
USPC .......... 429/455, 456, 458, 459, 416, 434, 436
IPC .................................... H01M 8/04007, 8/04097
See application file for complete search history.

(56) References Cited

U.S. PATENT DOCUMENTS 7,820,333 B2 * 10/2010 Senner et al. ................. 429/454
2010/0015488 A1 1/2010 Ozaki et al.
2010/0119906 A1 5/2010 Ono

FOREIGN PATENT DOCUMENTS

EP 2 109 176 A1 10/2009
EP 2 124 283 A1 11/2009
(Continued)

OTHER PUBLICATIONS

International Search Report issued in International Patent Application No. PCT/IB2010/003440 dated May 23, 2011.
(Continued)

*Primary Examiner* — Patrick Ryan
*Assistant Examiner* — Julian Anthony
(74) *Attorney, Agent, or Firm* — Oliff PLC

(57) ABSTRACT

A fuel cell module includes: in a casing, a fuel cell stack that is formed by stacking a plurality of unit cells; and an oxidant gas distributing member that is disposed at a side surface, that extends in a stack direction, of the fuel cell stack, that extends in a direction from one end to another end of each of the unit cells, and that supplies the oxidant gas along the oxidant gas distributing member from the one end to the another end to supply the oxidant gas to the another end of each unit cell. The oxidant gas distributing member includes a heat exchange restraint portion that restrains heat exchange between the unit cells and the oxidant gas in at least one of end portions of the fuel cell stack in the stack direction, in comparison with the heat exchange thereof in other portion in the fuel cell stack.

9 Claims, 11 Drawing Sheets

(51) Int. Cl.
   *H01M 2/40*  (2006.01)
   *H01M 8/24*  (2006.01)
   *H01M 8/06*  (2006.01)
   *H01M 8/02*  (2006.01)
   *H01M 8/12*  (2006.01)

(56) References Cited

FOREIGN PATENT DOCUMENTS

| | | |
|---|---|---|
| EP | 2 273 597 A1 | 1/2011 |
| JP | A-2006-331881 | 12/2006 |
| JP | A-2007-59377 | 3/2007 |
| JP | A-2007-157479 | 6/2007 |
| JP | A-2010-146783 | 7/2010 |
| WO | WO 2009/016857 A1 | 2/2009 |
| WO | WO 2009/119615 A1 | 10/2009 |

OTHER PUBLICATIONS

Written Opinion of the International Search Authority issued in International Patent Application No. PCT/IB2010/003440 dated May 23, 2011.

* cited by examiner

F I G . 1
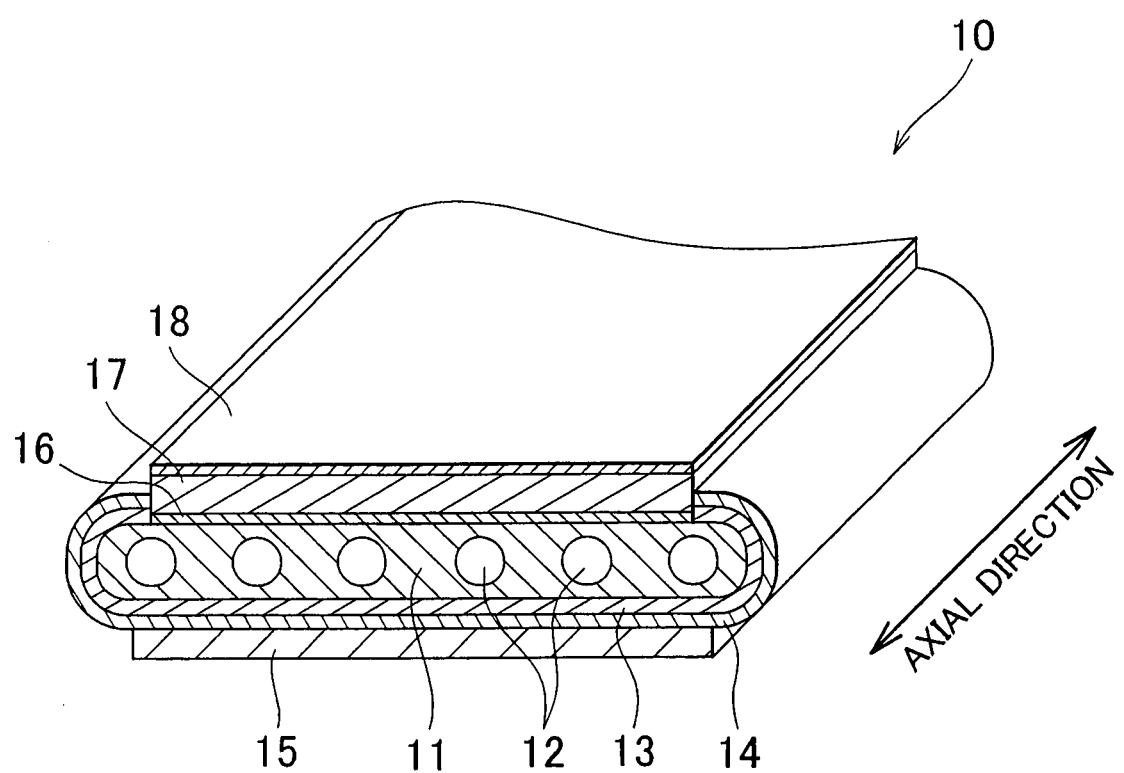

FUEL CELL MODULE

BACKGROUND OF THE INVENTION

1. Field of the Invention

The invention relates to a fuel cell module.

2. Description of the Related Art

The fuel cell generates electric energy, generally, by using hydrogen and oxygen as fuels. The fuel cell is environment-friendly and is able to achieve high energy efficiency, so that fuel cells are being widely researched and developed as a future energy supply source.

Generally, a fuel cell has a fuel cell stack that is constructed by stacking a plurality of unit cells, and therefore generates large electric power. Japanese Patent Application Publication No. 2007-59377 (JP-A-2007-59377) describes a reformer-integrated type fuel cell in which a reformer is disposed on an upper portion of a fuel cell stack. In this technology, oxidant gas flows in a reactant gas distributing member, and is thereby supplied to a lower end of each unit cell.

In contrast, according to the technology described in JP-A-2007-59377, in the fuel cell stack in which a plurality of unit cells are stacked, the amount of heat dissipation varies between unit cells located at a central portion of the fuel cell stack in the cell stack direction and unit cells located in at end portions of the fuel cell stack in the stack direction. Therefore, difference in temperature in the fuel cell stack in the stack direction, that is the temperature is relatively high in a central portion, and relatively low in end portions may occur. If such a temperature difference occurs within the fuel cell stack, the electricity generation efficiency may decline.

SUMMARY OF THE INVENTION

The invention provides a fuel cell module capable of reducing the temperature difference within a fuel cell stack.

A first aspect of the fuel cell module includes in a casing: a fuel cell stack that is formed by stacking a plurality of unit cells that generate electricity using an oxidant gas and a fuel gas; and an oxidant gas distributing member that is disposed at a side surface, that extends in a stack direction of the unit cells, of the fuel cell stack that extends in a direction from one end to another end of each of the unit cells, and that supplies the oxidant gas for use for electricity generation of the unit cells to the another end of each unit cell after supplying the oxidant gas through the oxidant gas distributing member in the direction of the unit cells from the one end to the another end. The oxidant gas distributing member includes a heat exchange restraint portion that restrains heat exchange between the unit cells and the oxidant gas in at least one of end portions of the fuel cell stack in the stack direction of the unit cells, in comparison with the heat exchange between the unit cells and the oxidant gas in other portion in the fuel cell stack.

According to the above aspect, the heat of the unit cells disposed at least one of the end portion of the fuel cell stack in the stack direction of the unit cells can be restrained from being transferred to the oxidant gas. Due to this effect, it becomes possible to reduce the temperature difference within the fuel cell stack in the stack direction of the unit cells.

In the above aspect, the heat exchange restraint portion may include a high flow-resistance portion that has a higher flow-resistance in at least one of end portions of the oxidant gas distributing member in the stack direction of the unit cells than other portion in the oxidant gas distributing member.

In the above aspect, the high flow-resistance portion may be a portion of the oxidant gas distributing member whose cross-sectional area is smaller than that of the other portion.

In the above aspect, the high flow-resistance portion may be a portion of the oxidant gas distributing member in which a closure member is inserted.

In the above aspect, the high flow-resistance portion may be formed in at least one of the end portions of the oxidant gas distributing member in the stack direction of the unit cells.

In the above aspect, the heat exchange restraint portion may have a thermal insulation member that is disposed on an internal wall surface or an external wall surface of the oxidant gas distributing member.

In the above aspect, the thermal insulation member may be disposed in at least one of end portions of the oxidant gas distributing member in the stack direction of the unit cells.

In the above aspect, the fuel cell module may further include a reformer that is disposed at the one end of each unit cell and that has an evaporation portion that evaporates reforming water. The evaporation portion may be formed at one of end portions of the reformer in the stack direction of the unit cells. The heat exchange restraint portion may be disposed on at least one side, on which the evaporation portion is provided, of the oxidant gas distributing member.

According to this aspect, the heat of the fuel cell disposed at the end portion of the fuel cell stack on which the evaporation portion is provided can be restrained from being transferred to the oxidant gas. Due to this effect, it becomes possible to reduce the temperature difference within the fuel cell stack in the stack direction of the unit cells.

In the above aspect, the fuel cell module may further include a combustion portion that is disposed between the one end of the unit cells and the reformer, and that burns a fuel off-gas that is left unused in the electricity generation of the unit cells using an oxidant off-gas that is left unused in the electricity generation of the unit cells.

According to the above aspect, it becomes possible to provide a fuel cell module that can reduce the temperature difference within the fuel cell stack.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a partial perspective view of a unit cell which includes a cross-section of the unit cell;

DETAILED DESCRIPTION OF EMBODIMENTS

Figure 2A:
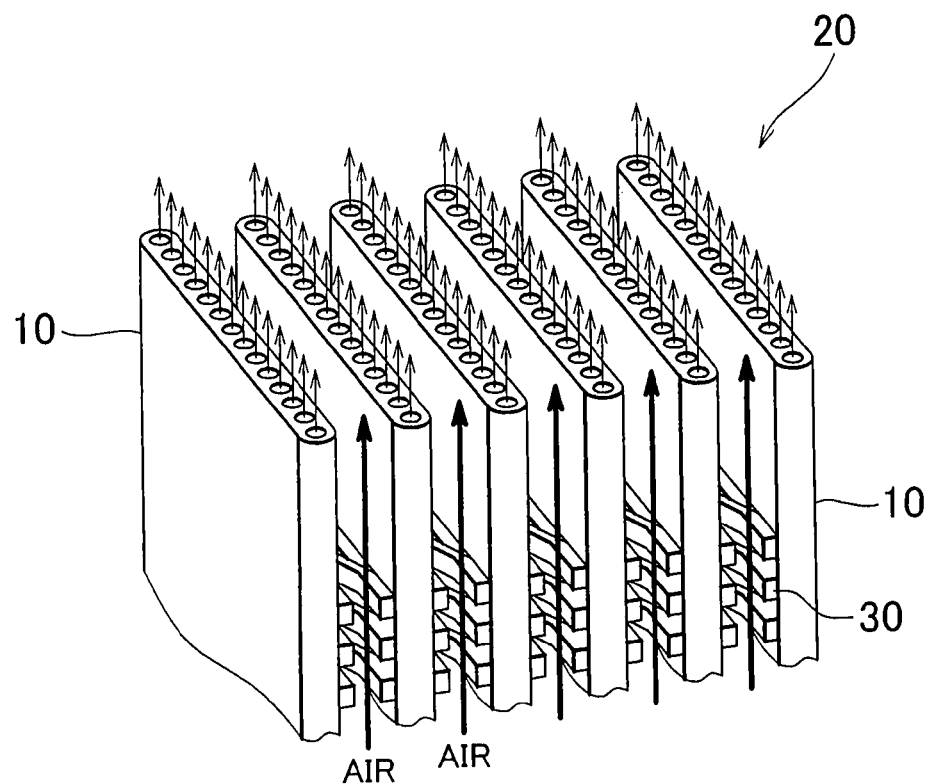
FIG. 2A is a perspective view in which a portion of a fuel cell stack is shown in order to illustrate the fuel cell stack.

The embodiments of the invention will be described below.

Firstly, a fuel cell module in accordance with a first embodiment of the invention will be described. FIG. 1 is a partial perspective view of a unit cell 10 which includes a cross-sectional view of the unit cell 10. As shown in FIG. 1, the unit cell 10 has a flattened column shape as a whole. Within an electroconductive support 11 having gas permeability, there are formed a plurality of fuel gas passageways 12 extending through the unit cell 10 in the direction of an axis thereof. A fuel electrode 13, a solid electrolyte 14 and an oxygen electrode 15 are stacked in that order on one of two side surfaces of an outer periphery of the electroconductive support 11. On the other side surface that opposes the oxygen electrode 15, there is provided an interconnector 17 underneath which a joining layer 16 lies. A p-type semiconductor layer 18 is provided on top of the interconnector 17.

A fuel gas containing hydrogen is supplied to the fuel gas passageways 12, so that hydrogen is supplied to the fuel electrode 13. On the other hand, an oxidant gas containing oxygen is supplied to the surroundings of the unit cell 10. Electricity is generated by the following electrode reactions occurring at the oxygen electrode 15 and the fuel electrode 13. The electricity generating reaction takes place at a temperature, for example, 600° C. to 1000° C.

Oxygen electrode: $1/2O_2 + 2e^- \rightarrow O^{2-}$ (solid electrolyte)
Fuel electrode: $O^{2-}$ (solid electrolyte) $+ H_2 \rightarrow H_2O + 2e^-$ A material of the oxygen electrode 15 has oxidation resistance, and is porous so that gaseous oxygen will reach an interface between the oxygen electrode 15 and the solid electrolyte 14. The solid electrolyte 14 has a function of migrating oxygen ion $O^{2-}$ from the oxygen electrode 15 to the fuel electrode 13. The solid electrolyte 14 is composed of an oxygen ion-conductive oxide. Besides, the solid electrolyte 14 is stable in an oxidative atmosphere and also in a reductive atmosphere, and is composed of a compact material, in order to physically separate the fuel gas and the oxidant gas. The fuel electrode 13 is formed from a porous material that is stable in the reductive atmosphere and has affinity to hydrogen. The interconnector 17 is provided in order to electrically connect the unit cells 10 to each other in series, and is composed of a compact material so as to physically separate the fuel gas and the oxygen-containing gas.

For example, the oxygen electrode. 15 is formed from a lanthanum cobaltite-base perovskite-type composite oxide, and the like, that is highly conductive for both electrons and positive ions. The solid electrolyte 14 is formed from, for example, a zirconia ($ZrO_2$) containing $Y_2O_3$ (YSZ) which is high in ion conductivity, and the like. The fuel electrode 13 is formed from, for example, a mixture of $Y_2O_3$-containing $ZrO_2$ (YSZ) and Ni, which is high in electron conductivity. The interconnector 17 is formed from, for example, a solid solution of $LaCrO_3$ with an alkaline earth oxide. As for these materials, materials that are similar to each other in thermal expansion coefficient are used.

FIG. 2A is a perspective view in which a portion of a fuel cell stack 20 is shown in order to illustrate the fuel cell stack 20. In the fuel cell stack 20, a plurality of unit cells 10 are stacked in a row. In this case, the unit cells 10 are stacked so that the oxygen electrode 15 side of the unit cell 10 faces the interconnector 17 side of the adjacent unit cell 10.

Figure 2B:
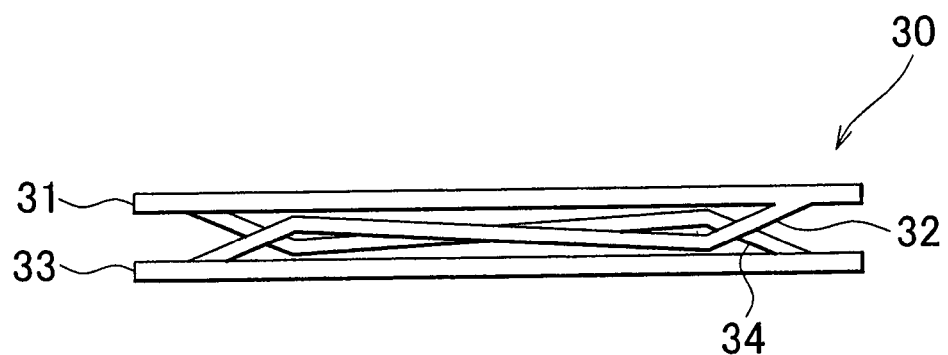
FIG. 2B is a plan view of a current collector shown in FIG. 2A.

Current collectors 30 are disposed between the unit cells 10. The current collectors 30 electrically connect adjacent unit cells 10 in series. FIG. 2B is a plan view showing an example of the current collector 30. The current collector 30 includes as a basic components: a first current collector piece 31 that contacts the oxygen electrode 15 of one of the two adjacent unit cells 10; a second current collector piece 32 that extends diagonally from the one of the unit cell 10 to the other one of the two adjacent unit cells 10; a third current collector piece 33 that contacts the interconnector 17 of the other one of the unit cell 10; and a fourth current collector piece 34 that extends diagonally from the other one of the unit cell 10 to the one of the unit cell 10. One of two opposite ends of the second current collector piece 32 is connected to the first current collector piece 31, and the other end of the second current collector piece 32 is connected to the third current collector, piece 33. One of two opposite ends of the fourth current collector piece 34 is connected to the third current collector piece 33, and the other end of the fourth current collector piece 34 is connected to the first current collector piece 31. A plurality of such basic components are linked together in the axial direction of the unit cells 10 so as to form the current collector 30.

The second current collector piece 32 and the fourth current collector piece 34 each have bent portions (two bent portions in the first embodiment). Due to the bent portions, the second current collector piece 32 and the fourth current collector piece 34 performs a function as springs. Due to the spring structure, the current collectors 30 have a characteristic of closely attaching to the unit cells 10 and a characteristic of following deformation of the unit cells 10. Besides, due to spring structure, a space is formed between the first current collector piece 31 and the third current collector piece 33, the current collectors 30 have a ventilation characteristic.

Figures 3A, 3B:
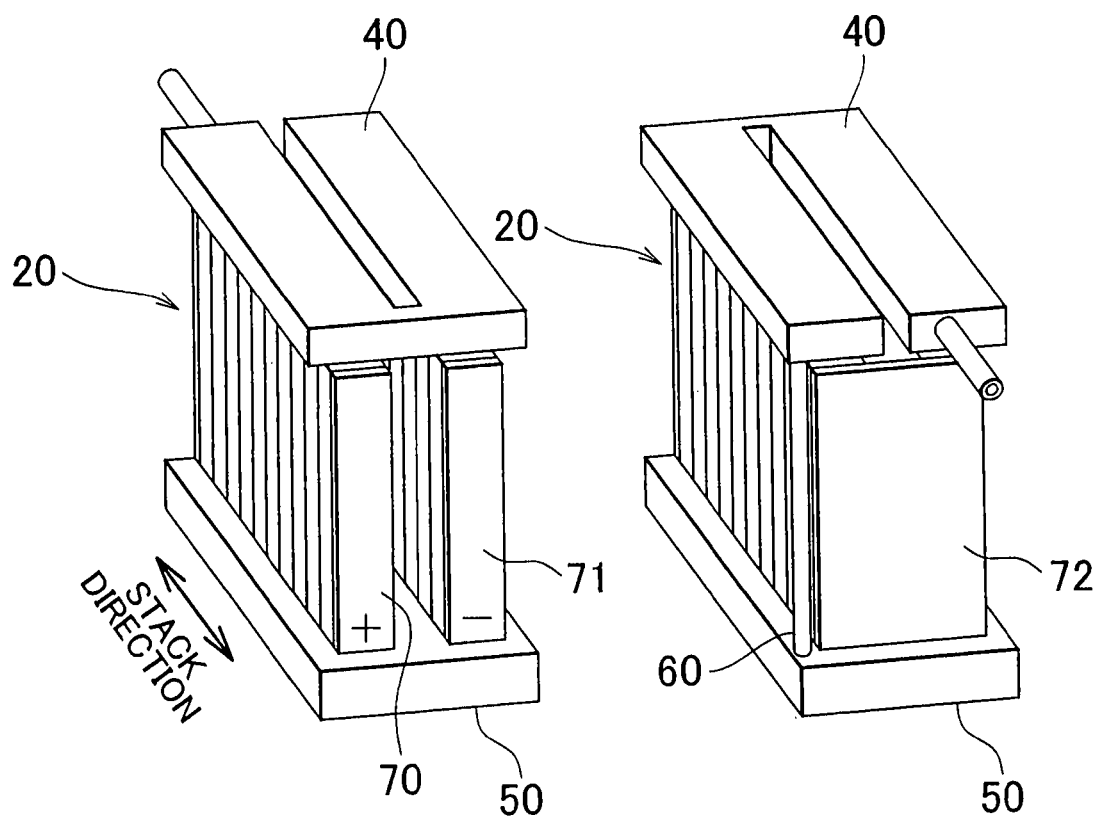
FIG. 3A is a perspective view for describing a reformer, a manifold to which fuel cell stacks are fixed, and terminals, which is viewed from a side.
FIG. 3B is a perspective view for describing the reformer, the manifold to which the fuel cell stacks are fixed, and the terminal, which is viewed from another side.

FIG. 3A and FIG. 3B are perspective views for describing a reformer 40, a manifold 50 to which fuel cell stacks 20 are fixed, and terminals. Two fuel cell stacks 20 are disposed on the manifold 50, and the reformer 40 is disposed over the fuel cell stacks 20.

The two fuel cell stacks 20 are disposed side by side so that the stack directions of the unit cells 10 of the two fuel cell stacks 20 are substantially parallel to each other. Incidentally, the number of fuel cell stacks 20 fixed to the manifold 50 is not limited. The reformer 40 extends over one of the two fuel cell stacks 20 in the stack direction of the unit cells 10, extends over the other fuel cell stack 20 in the stack direction of the unit cells 10, and the two extended ends are interconnected to form substantially a U-shape. As shown in FIG. 3B, an outlet opening of the reformer 40 and an inlet opening of the manifold 50 are interconnected by a fuel gas piping 60.

As shown in FIG. 3A, a first terminal 70 is disposed on a positive end portion of one of the two fuel cell stacks 20 in the stack direction of the unit cells 10. A second terminal 71 is disposed on a negative end portion of the other fuel cell stack 20 in the stack direction of the unit cells 10. As shown in FIG. 3B, the negative end portion of the one fuel cell stack 20 and the positive end portion of the other fuel cell stack 20 are electrically connected in series by a third terminal 72. When a load is electrically connected to the first terminal 70 and the second terminal 71, the load can be supplied with electric power that is generated by the fuel cell stacks 20.

Figure 4:
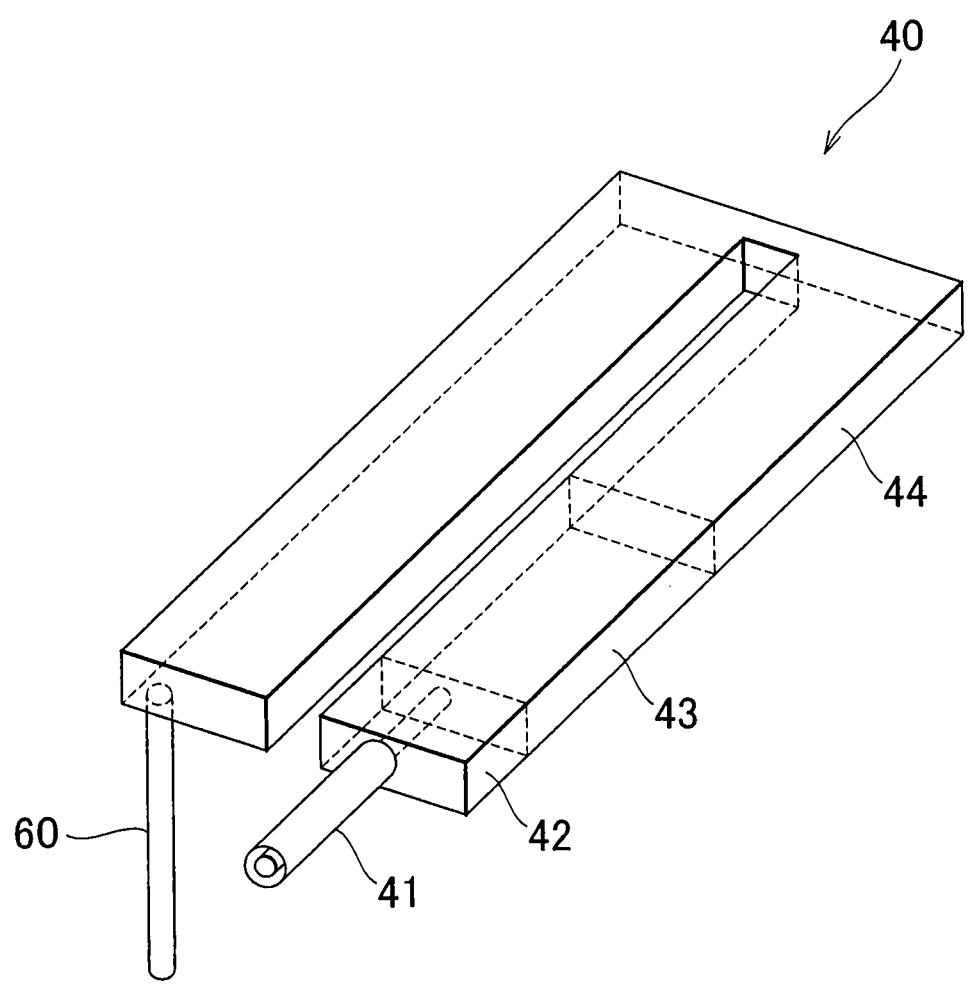
FIG. 4 is a perspective view for describing details of the reformer.

FIG. 4 is a perspective view for describing details of the reformer 40. The reformer 40 has a structure in which an input port member 41, an evaporation portion 42, a heating portion 43, and a reforming portion 44 are connected in that order from the inlet opening side. The input port member 41 is supplied with a hydrocarbon-base fuel and a reforming water. The hydrocarbon-base fuel for use herein may be, for example, a coal gas (town gas). In the first embodiment, the input port member 41 has a double-pipe structure. The reforming water is introduced to the inner pipe of the input port member 41, and the hydrocarbon-base fuel is introduced to the space between the inner pipe and the outer pipe.

The evaporation portion 42 is a space in which reforming water is evaporated by utilizing combustion heat of a fuel off-gas described below. In the first embodiment, the inner pipe of the input port member 41 extends to the evaporation portion 42. The reforming water introduced to the input port member 41 flows out from a distal end of the inner pipe of the input port member 41, and evaporates within the evaporation portion 42. After that, reforming water (vapor) flows into the heating portion 43. The hydrocarbon-base fuel introduced to the input port member 41 flows into the evaporation portion 42, and then flows into the heating portion 43.

The heating portion 43 is a space in which the reforming water and the hydrocarbon-base fuel are heated by combustion heat of the fuel off-gas. For example, ceramics balls are enclosed in the heating portion 43. The reforming portion 44 is a space in which the steam-reforming reaction of the reforming water and the hydrocarbon-base fuel takes place. For example, ceramics balls to which a reforming catalyst, such as Ni, Ru, Rh, Pt, etc., is applied are enclosed in the reforming portion 44.

Figure 5:
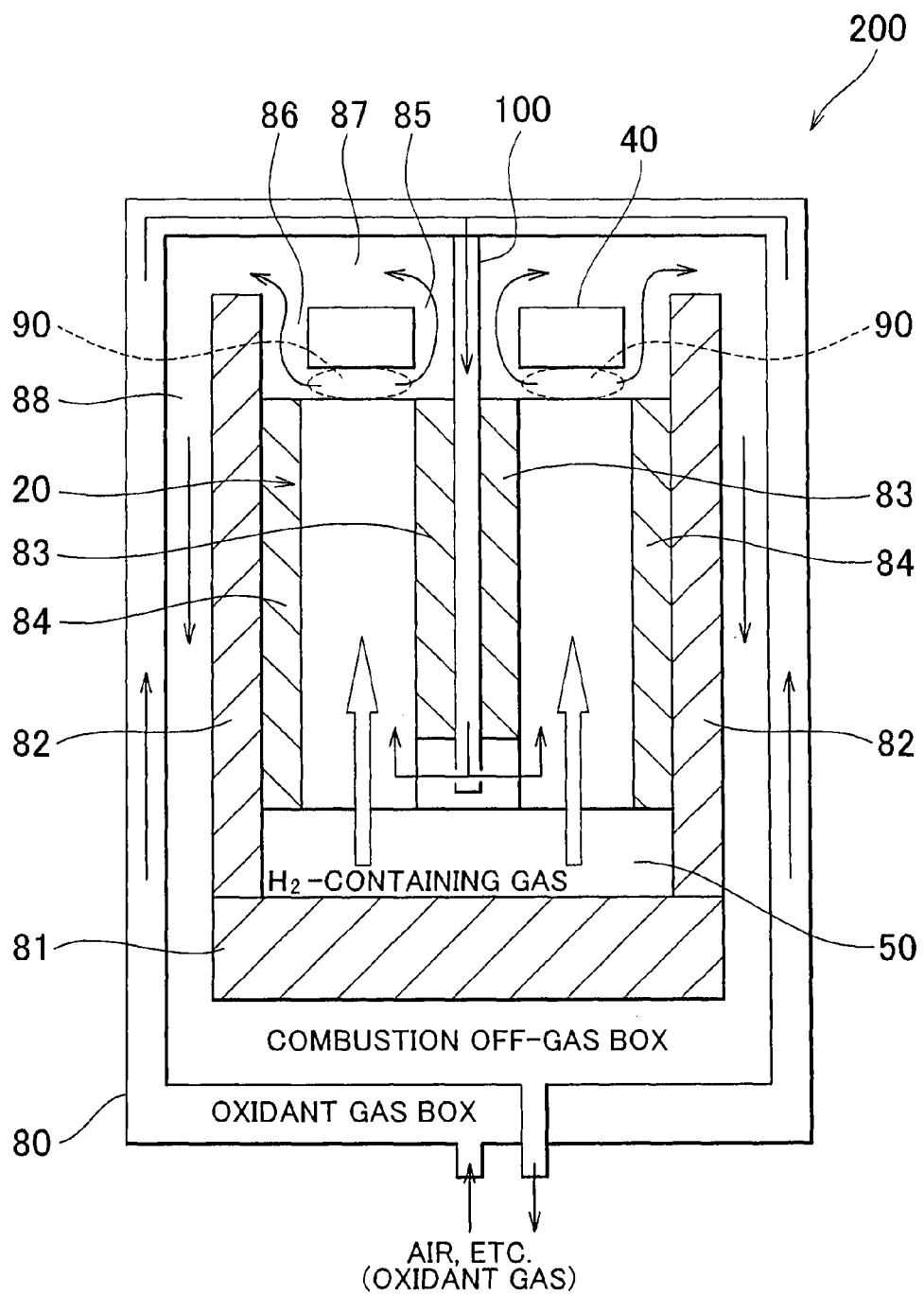
FIG. 5 is a sectional view for describing an overall construction of a fuel cell module in accordance with a first embodiment.

FIG. 5 is a sectional view for describing an overall construction of a fuel cell module 200 in accordance with the first embodiment. The fuel cell module 200 is disposed in a casing 80 having a double wall which forms a flow channel in which the oxidant gas flow. A lower thermal insulation member 81 disposed in a lower portion of the manifold 50, and side thermal insulation members 82 disposed in the stack direction of the unit cells 10 define a space in which the fuel cell stack 20, the reformer 40, the manifold 50, etc. shown in FIGS. 3A and 3B are housed. Incidentally, in the first embodiment, first internal thermal insulation members 83 are disposed between an oxidant gas distributing member 100 described below and the unit cells 10. Besides, second internal thermal insulation members 84 are disposed between the unit cells 10 and the side thermal insulation members 82. In the first embodiment, the unit cells 10 at the reformer 40 side is defined as upward, and the unit cells 10 at the manifold 50 side is defined as downward.

An oxidant gas inlet opening of the casing 80 is provided at a bottom surface of the casing 80. The oxidant gas enters an oxidant gas box, that is the bottom portion of the casing 80, and flows through side flow channels formed at the casing 80, and then flows above the fuel cell stacks 20. After that, the oxidant gas flows down into the oxidant gas distributing member 100 disposed between the two fuel cell stacks 20, and then is supplied to the fuel cell stacks 20 from their lower end. As described above with reference to FIGS. 3A and 3B, the fuel gas is supplied from the manifold 50 into the fuel gas passageways 12 of the unit cells 10. Thus, electricity is generated in each unit cell 10.

The fuel gas that has not been used for electricity generation (fuel off-gas) in the unit cells 10, and the oxidant gas that has not been used for electricity generation (oxidant off-gas) in the unit cells 10 merges at an upper end of the unit cells 10. Since the fuel off-gas contains combustibles, such as hydrogen and the like, that have not been used for electricity generation, the fuel off-gas can be burned by utilizing oxygen contained in the oxidant off-gas. In the first embodiment, the portions between the upper ends of the unit cells 10 and the reformer 40 are called combustion portions 90. The combustion heat generated at the combustion portions 90 is utilized for the reforming reaction in the reformer 40. Due to the combustion heat, the reforming reaction in the reformer 40 is accelerated.

After combusted in the combustion portions 90, the fuel off-gas and the oxidant off-gas (hereinafter, referred to as "combustion off-gas") flow into a combustion off-gas distributing channel. The combustion off-gas distributing channel includes first combustion off-gas distributing channels 85 formed between the oxidant gas distributing member 100 and the reformer 40, and second combustion off-gas distributing channels 86 formed between the side thermal insulation members 82 and the reformer 40. The combustion off-gas having passed through the first combustion off-gas distributing channels 85 is supplied to upper combustion off-gas channels 87 that are formed between an upper surface of an internal wall of the casing 80 and upper surfaces of the reformer 40. After that, the combustion off-gas flows down through side combustion off-gas channels 88 that are formed between the side thermal insulation members 82 and the casing 80. The combustion off-gas having passed through the second combustion off-gas distributing channels 86 flows into the side combustion off-gas channels 88, and flows downward therethrough. After flown through the side combustion off-gas channels 88, the combustion off-gas flows into an off-gas box that is formed between the lower thermal insulation member 81 and the oxidant gas box. After that, the off-gas is discharged from the fuel cell module 200.

Figure 6A:
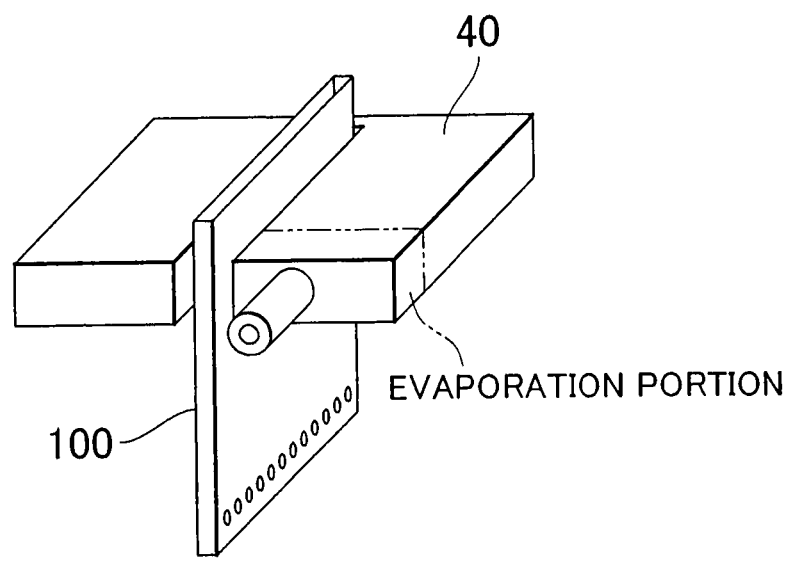
FIG. 6A is an extracted perspective view of an oxidant gas distributing member and the reformer.

FIG. 6A is an extracted perspective view of the oxidant gas distributing member 100 and the reformer 40. In first embodiment, the oxidant gas distributing member 100 is disposed in the casing 80 so as to be sandwiched between a portion of the reformer 40 that is above one of the two fuel cell stacks 20, and a portion of the reformer 40 that is above the other one of the two fuel cell stacks 20. An upper end portion of the oxidant gas distributing member 100 is protruded upward from the reformer 40, and is connected to a flow channel for supplying the oxidant gas to the upper portion of the casing 80. A lower end of the oxidant gas distributing member 100 extends to the vicinity of the unit cells 10.

Figure 6B:
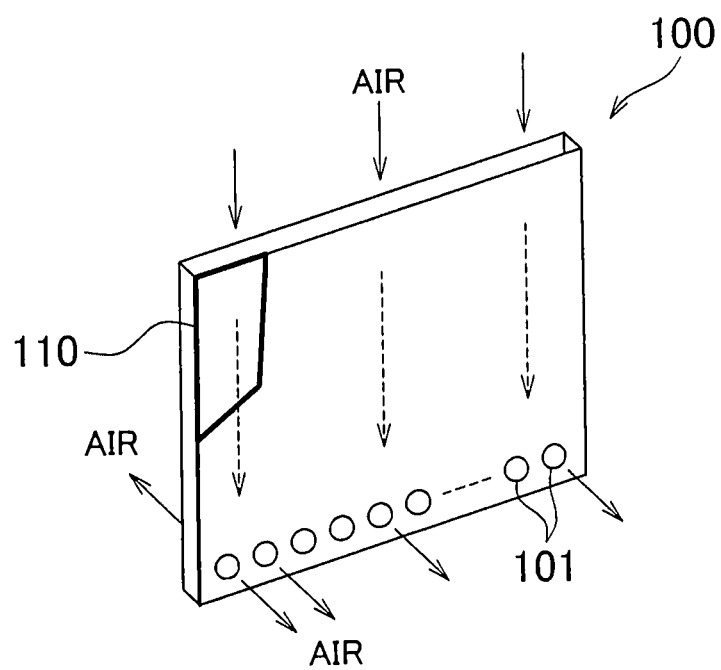
FIG. 6B is a perspective view of the oxidant gas distributing member.

FIG. 6B is a perspective view of the oxidant gas distributing member 100. The oxidant gas distributing member 100 has a flattened box shape and has a hollow space. The hollow space functions as a flow channel through which the oxidant gas flows. Hereinafter, the hollow space is called the oxidant gas distributing channel. The upper end portion of the oxidant gas distributing member 100 has an opening portion through which the oxidant gas flows into the oxidant gas distributing member 100. In the first embodiment, the opening portion at the upper end portion of the oxidant gas distributing member 100 extends entirely over the upper end portion of the oxidant gas distributing member 100. A lower end portion of the oxidant gas distributing member 100 that faces the two fuel cell stack 20 side walls has a plurality of oxidant gas outlet openings 101 that are formed at predetermined intervals along the stack direction of the unit cells 10. The oxidant gas discharged from the oxidant gas outlet openings 101 is supplied to the lower end portion of each unit cell 10. Specifically, the oxidant gas channel of the oxidant gas distributing member 100 is a flow channel which supplies the oxidant gas along the reformer 40, the combustion portion 90, and an end (upper end) of the unit cells 10 to another end (lower end) of the unit cells 10 in that order, and the oxidant gas is then supplied to the lower end of each unit cell 10.

The oxidant gas distributing member 100 is provided with a heat exchange restraint portion 110. The heat exchange restraint portion 110 restrains the heat exchange between the oxidant gas flowing in the oxidant gas distributing channel and unit cells 10 in at least one end of the fuel cell stacks 20 in the stack direction of the unit cells 10 (hereinafter, referred to as "unit cells end"), in comparison with the heat exchange between the other unit cells 10 and the oxidant gas. In the first embodiment, the heat exchange restraint portion 110 restrains the heat exchange between unit cells end disposed at a side where the evaporation portion 42 is provided and the oxidant gas that flows in the oxidant gas distributing channel. The heat exchange restraint portion 110 is provided over a predetermined region that extends from an upper end to a lower end of unit cells 10 at the evaporation portion 42 side, and also extends in the stack direction of the unit cells 10.

Figure 7A:
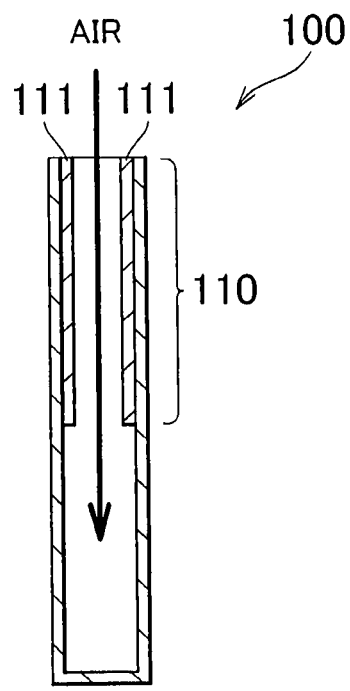
FIG. 7A and FIG. 7B are sectional views of the oxidant gas distributing member.
Figure 7B:
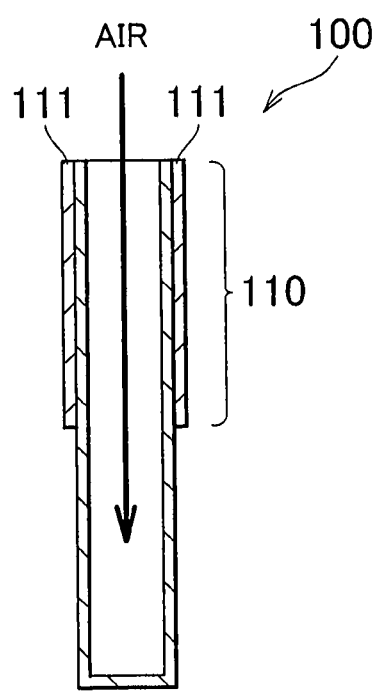

FIG. 7A is a sectional view of the oxidant gas distributing member 100 taken in a vertical direction of the unit cells 10 (an axial direction thereof). In the first embodiment, the heat exchange restraint portion 110 is provided with a thermal insulation sheet 111 that functions as a thermal insulation member. The thermal insulation sheet 111 is disposed so as to extend over internal wall surfaces of the oxidant gas distributing member 100 in the stack direction of the unit cells 10, that is, from one end to another end of the internal wall surface in the stack direction of the unit cells 10. The thermal insulation sheet 111 restrains the heat exchange between the unit cells end disposed at the end where the evaporation portion 42 is provided, and the oxidant gas that flows in the oxidant gas distributing channel. Incidentally, as shown in FIG. 7B, the thermal insulation sheet 111 may also be disposed on external wall surfaces of the oxidant gas distributing member 100. The thermal insulation sheet 111 used herein may be, for example, a ceramics sheet that is lower in heat conductivity than metal. Examples of the ceramics usable as a material of the thermal insulation sheet 111 include $ZrO_2$, $Si_3N_4$, $SiO_2$, $Al_2O_3$, etc.

In general, the temperature of the unit cells end of the fuel cell stacks 20 tends to be lower than the temperature of the other unit cells 10. This is because the heat dissipation of the unit cells end 10 is greater than the heat dissipation of the other unit cells 10. However, in this fuel cell module 200, the thermal insulation sheet 111 restrains transfer of heat from the unit cells end to the oxidant gas flowing in the oxidant gas distributing channel. Due to this effect, it is possible to reduce the temperature difference within the fuel cell stacks 20 in the stack direction of the unit cells 10.

Beside, the temperature of the evaporation portion 42 becomes particularly low in the reformer 40 due to effect of latent heat of vaporization of the reforming water and of the temperature of the reforming water or the town gas supplied, which is approximately equal to a room temperature. In the fuel cell module 200 in accordance with the first embodiment, when the thermal insulation sheet 111 disposed at the evaporation portion 42 side is disposed so as to face the evaporation portion 42 but not to face the unit cells 10, transfer of the heat from the oxidant gas flowing in the oxidant gas distributing channel to the evaporation portion 42 is restrained. Due to this effect, the temperature decline of the oxidant gas supplied to the lower end of each unit cell 10 is restrained. As a result, the temperature of the lower ends of the unit cells 10 that correspond to the thermal insulation sheet 111 can be raised. Besides, since the thermal insulation sheet 111 is disposed so as to face the evaporation portion 42 but not to face the unit cells 10, heat of the upper end of the unit cells 10 is not prevented from being transferred to the oxidant gas flowing in the oxidant gas distributing channel. Therefore, it is possible to reduce the temperature of the upper end of the unit cells 10 that correspond to the thermal insulation sheet 111. Due to this effect, it becomes possible to reduce the temperature difference within the up-down direction in each of the unit cells 10 that correspond to the thermal insulation sheet 111.

Besides, since the transfer of heat from the oxidant gas flowing in the oxidant gas distributing channel to the evaporation portion 42 is restrained, it is possible to reduce the temperature difference of the oxidant gas flowing in the oxidant gas distributing channel in the stack direction of the unit cells 10. This restrains occurrence of the temperature distribution in the oxidant gas supplied to the unit cells 10 in the stack direction of the unit cells 10, it is possible to reduce the temperature difference within the fuel cell stacks 20 in the stack direction of the unit cells 10.

Figure 8A:
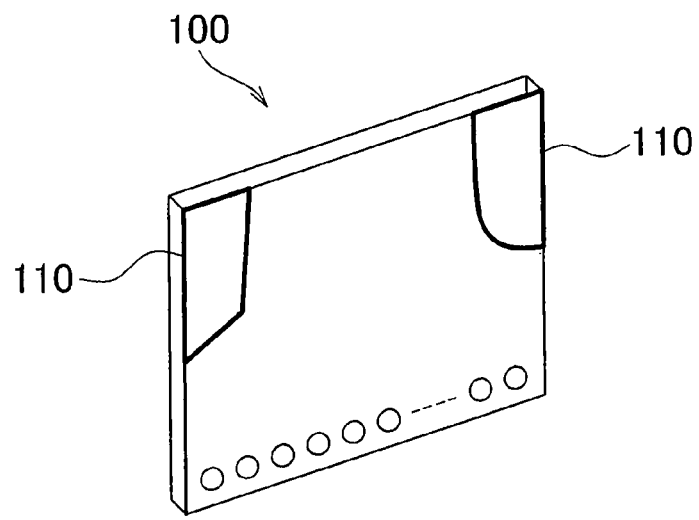
FIG. 8A is a perspective view of an oxidant gas distributing member in accordance with a first modification of the first embodiment.

As a first modification of the first embodiment, the heat exchange restraint portion 110 may be provided on the unit cells end opposite to the evaporation portion 42. The opposite unit cells end also tend to have low temperature. However, in this case, the heat exchange restraint portion 110 on the evaporation portion 42 side may be made larger than the one on the opposite side. FIG. 8A is a perspective view of an oxidant gas distributing member 100 in accordance with the first modification of the first embodiment. In this case, the heat exchange between the unit cells end opposite the evaporation portion 42 side and the oxidant gas flowing in the oxidant gas distributing channel can be restrained.

Figure 8B:
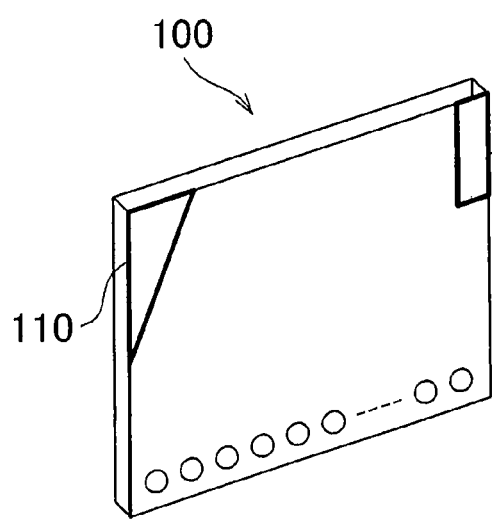
FIG. 8B is a perspective view of an oxidant gas distributing member in accordance with a second modification of the first embodiment.

The shape of the heat exchange restraint portion 110 is not particularly limited. FIG. 8B is a perspective view of a oxidant gas distributing member 100 in accordance with a second modification of the first embodiment. The heat exchange restraint portion 110 at the evaporation portion 42 side has a triangular shape. On the other hand, the heat exchange restraint portion 110 opposite the evaporation portion 42 has a rectangular shape. In this case, the heat exchange between the oxidant gas flowing in the oxidant gas distributing channel and both the evaporation portion 42 and the unit cells end of the fuel cell stacks 20 can be restrained.

Figure 8C:
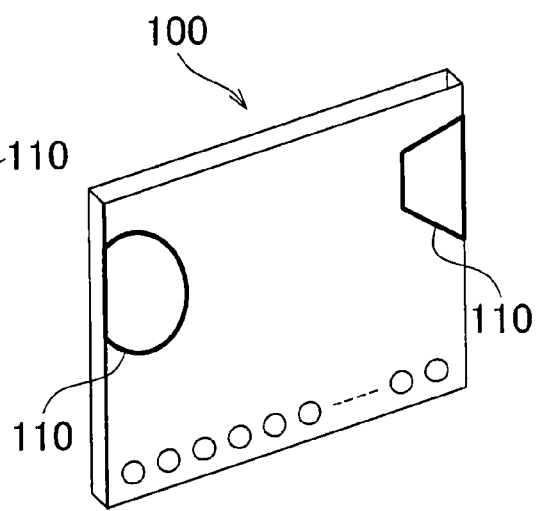
FIG. 8C is a perspective view of an oxidant gas distributing member in accordance with a third modification of the first embodiment.

As a third modification of the first embodiment, a predetermined distance may be provided between an upper end the heat exchange restraint portion 110 and the oxidant gas distributing member 100. FIG. 8C is a perspective view of the oxidant gas distributing member 100 in accordance with the third modification of the first embodiment. In this case, the heat exchange between the oxidant gas flowing the oxidant gas distributing channel and both the evaporation portion 42 and the unit cells end of the fuel cell stacks 20 can be restrained.

Figure 9A:
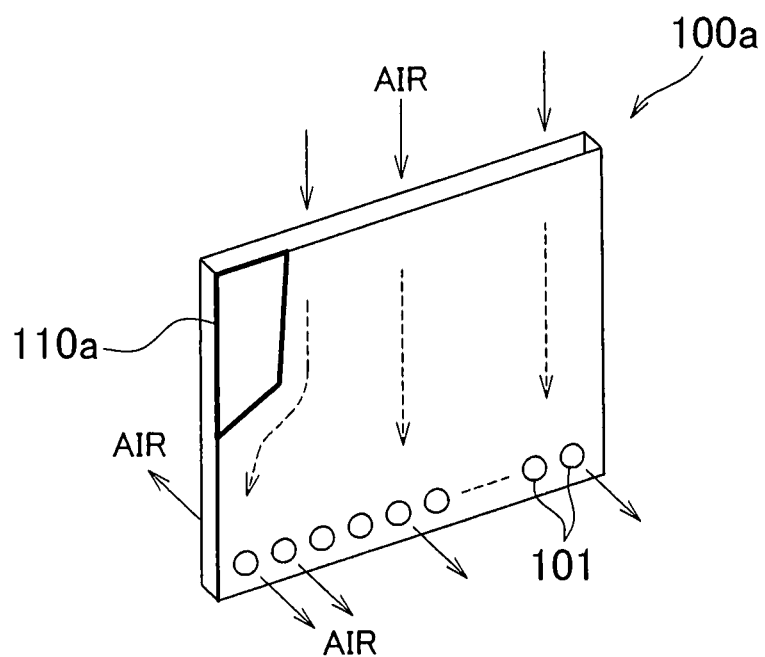
FIG. 9A is a perspective view of an oxidant gas distributing member in accordance with a second embodiment.

Subsequently, a fuel cell module in accordance with a second embodiment will be described. The fuel cell module is equipped with an oxidant gas distributing member 100a instead of the oxidant gas distributing member 100. FIG. 9A is a perspective view of an oxidant gas distributing member 100a. The oxidant gas distributing member 100a is different from the oxidant gas distributing member 100 in that the oxidant gas distributing member 100a is equipped with a heat exchange restraint portion 110a instead of the heat exchange restraint portion 110.

Figure 9B:
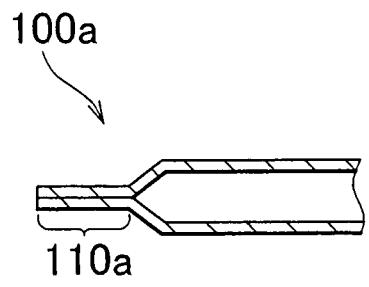
FIG. 9B is a sectional view of a heat exchange restraint portion of the oxidant gas distributing member and a portion thereof adjacent to the heat exchange restraint portion, which is viewed from an upper-end opening portion side.

FIG. 9B is a sectional view of a vicinity of the heat exchange restraint portion 110a of the oxidant gas distributing member 100a viewed from an upper-end opening portion. The heat exchange restraint portion 110a functions as a high flow-resistance portion that has higher flow-resistance than other portions at the unit cells end. Concretely, the heat exchange restraint portion 110a is different from the heat exchange restraint portion 110 in that the oxidant gas distributing channel is provided with a closed portion instead of the thermal insulation sheet 111 being disposed. A portion in which the oxidant gas distributing channel is closed functions as the high flow -resistance portion. For example, the portion in which the oxidant gas distributing channel is closed can be formed by flattening the side walls of the oxidant gas distributing member 100a that face the fuel cell stack 20 by pressing.

Figure 9C:
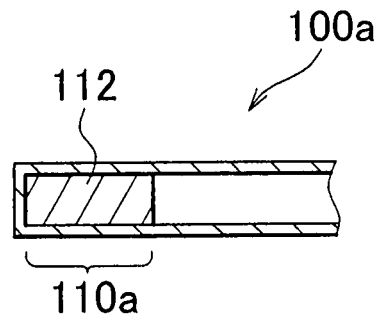
FIG. 9C is a sectional view of a heat exchange restraint portion of an oxidant gas distributing member equipped with a closure member and a portion of the oxidant gas distributing member adjacent to the heat exchange restraint portion, which is viewed from an upper-end opening portion side.

Alternatively, as shown in FIG. 9C, a portion in which the oxidant gas distributing channel is closed can also be provided by disposing a closure member 112 in the hollow space of the oxidant gas distributing member 100a. Incidentally, it is also permissible to adopt a construction in which the oxidant gas flows in the heat exchange resistant portion 110a as long as the heat exchange resistant portion 110a has a higher flow-resistance in its unit cells end than in other portions thereof. For example, by forming the closure member 112 of the heat exchange resistant portion 110a from a porous material other than the porous material of the thermal insulation sheet 111, it is possible to make a construction in which the oxidant gas flows in the heat exchange resistant portion 110a without impairing the function as the high flow-resistance portion.

According to the fuel cell module 200a in accordance with this embodiment, since the heat exchange resistant portion 110a is equipped with the high flow-resistance portion, it is possible to restrain the heat exchange between both the evaporation portion 42 and unit cells end in at least one of the two ends of the fuel cell stacks 20 and the oxidant gas flowing in the oxidant gas distributing channel. Due to this effect, it is possible to reduce the temperature difference within the fuel cell stacks 20 in the stack direction of the unit cells 10. Besides, in the case where the heat exchange resistant portion 110a disposed at the evaporation portion 42 side is disposed so as to face the evaporation portion 42 but not to face the unit cells 10, the heat exchange resistant portion 110a restrains the transfer of heat from the oxidant gas flowing in the oxidant gas distributing channel to the evaporation portion 42. Due to this effect, decline in the temperature of the oxidant gas supplied to the lower end of each unit cell 10 is restrained, so that the temperature of the lower end of each unit cell 10 can be raised. Besides, because the heat exchange resistant portion 110a is disposed so as to face the evaporation portion 42 but not to face the unit cells 10, the transfer of heat from the upper end of the unit cells 10 to the oxidant gas flowing in the oxidant gas distributing channel is not prevented, so that the temperature of the upper end of the unit cells 10 that corresponds to the heat exchange resistant portion 110a can be reduced. Due to this effect, it is possible to reduce the temperature difference in the up-down direction in the unit cells 10 that correspond to the heat exchange resistant portion 110a.

Besides, the high flow-resistance portion reduces the channel cross-sectional area of the oxidant gas distributing channel. Due to this effect, it is possible to further uniformalize the temperature distribution in the stack direction of the unit cells 10 in the oxidant gas that flows in the oxidant gas distributing-channel. As a result, occurrence of temperature distribution in the fuel cell stacks 20 in the stack direction of the unit cells 10 can be further restrained.

Figure 10A:
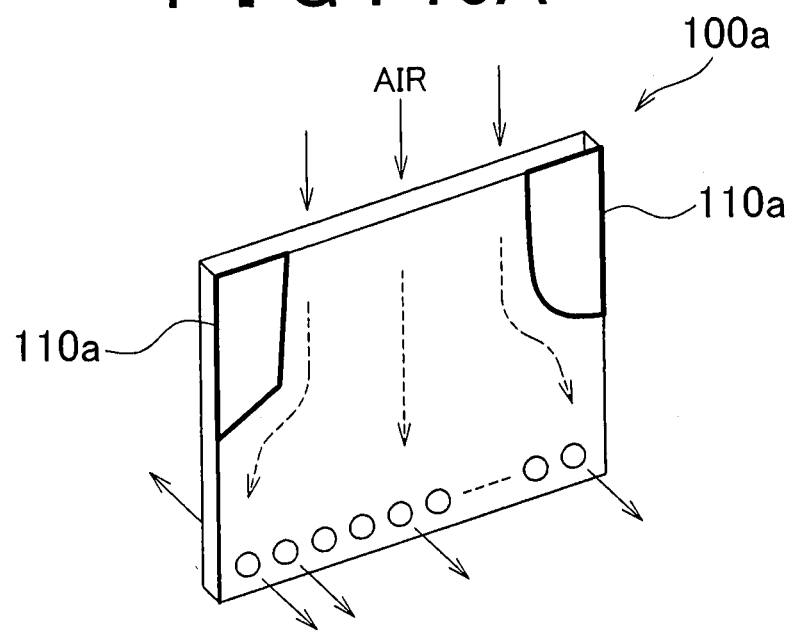
FIG. 10A is a perspective view of an oxidant gas distributing member in accordance with a first modification of the second embodiment.

Incidentally, the heat exchange resistant portion 110a may be provided at an unit cells end opposite to the evaporation portion 42 side. FIG. 10A is a perspective view of an oxidant gas distributing member 100a in accordance with a first modification of the second embodiment. In this case, it is possible to restrain the heat exchange between the oxidant gas that flows in the oxidant gas distributing-channel and each of the evaporation portion 42, a evaporation portion 42-side group of unit cells end, and a group of unit cells end opposite to the evaporation portion 42.

Figure 10B:
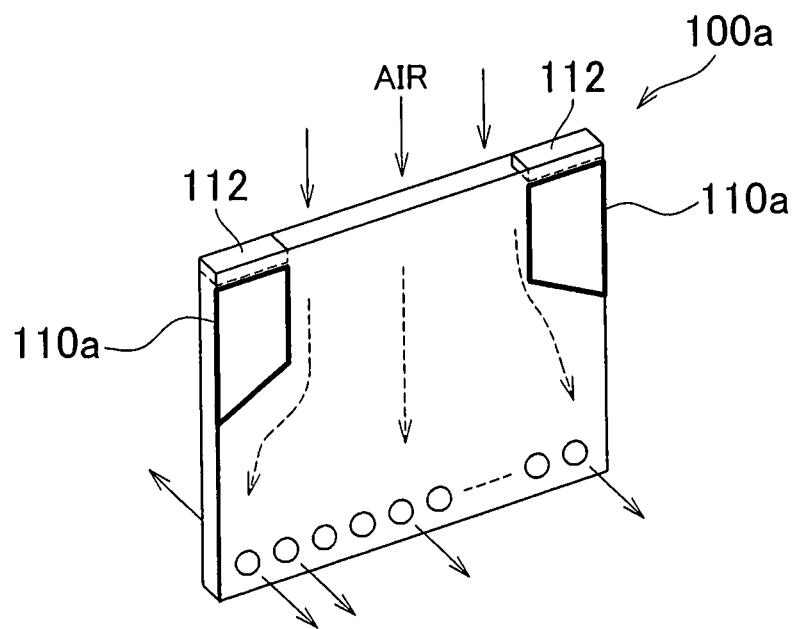
FIG. 10B is a perspective view of an oxidant gas distributing member in accordance with a second modification of the second embodiment.

The shape of the heat exchange resistant portion 110a is not particularly limited. Besides, the position of the closure member 112 in the oxidant gas distributing member 100a is not particularly limited. FIG. 10B is a perspective view of an oxidant gas distributing member 100a in accordance with a second modification of the second embodiment. Closure members 112 are disposed at an evaporation portion 42 side of an upper end portion of the oxidant gas distributing member 100a, and at the opposite side of the upper end portion thereof to the evaporation portion 42 side. In this case, a region in which the oxidant gas does not move is formed below the closing members 112. The region below the closure member 112 in which the oxidant gas does not flow is the heat exchange resistant portion 110a. As a result, it is possible to restrain the heat exchange of the oxidant gas that flows in the oxidant gas distributing-channel with the evaporation portion 42, evaporation portion 42 side group of unit cells end and unit cells end opposite to the evaporation portion 42.

Figure 11:
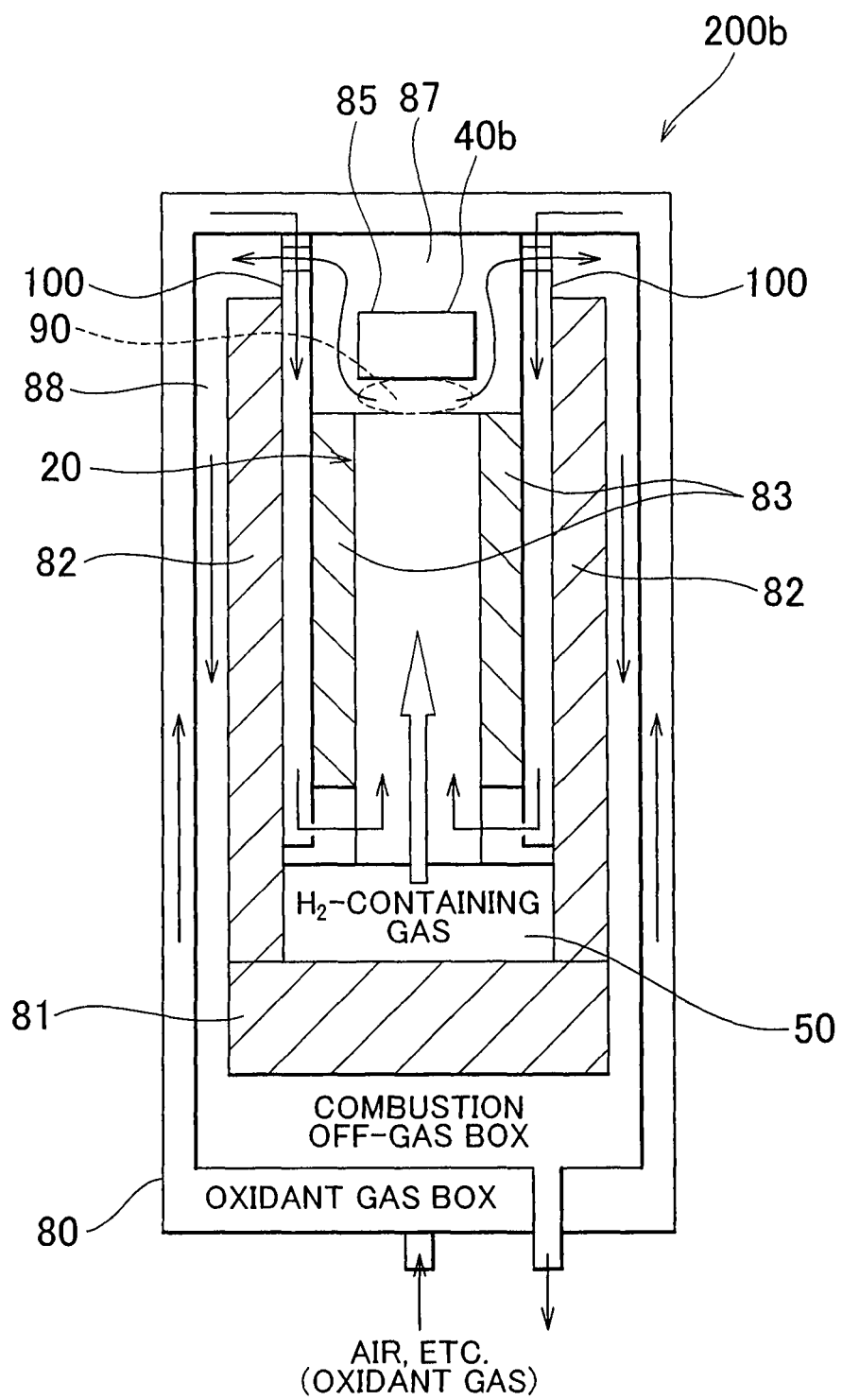
FIG. 11 is a sectional view for describing an overall construction of a fuel cell module in accordance with the third embodiment.

Subsequently, a fuel cell module 200b in accordance with a third embodiment of the invention will be described. FIG. 11 is a sectional view for describing an overall construction of the fuel cell module 200b. The fuel cell module 200b is different from the fuel cell module 200 shown in FIG. 5, in that the fuel cell module 200b has one fuel cell stack 20, and that the fuel cell module 200b has a reformer 40b instead of the reformer 40, and that the fuel cell module 200b does not have a second internal thermal insulation member 84. The reformer 40b has a construction that corresponds to only one of two sections of the reformer 40 shown in FIG. 4 which are correspondingly located above the two fuel cell stacks 20.

In the fuel cell module 200b in accordance with this embodiment, the thermal insulation sheet 111 of the oxidant gas distributing member 100 restrains the heat exchange between the oxidant gas that flows in the oxidant gas distributing-channel and both the evaporation portion 42 and unit cells end at a side of the evaporation portion 42. Due to the effect, it is possible to reduce the temperature difference within the fuel cell stack 20 in the stack direction of the unit cells 10. Besides, in the case where the thermal insulation sheet 111 disposed at the evaporation portion 42 side is disposed so as to face the evaporation portion 42 but not to face the unit cells 10, the transfer of heat from the oxidant gas flowing in the oxidant gas distributing-channel to the evaporation portion 42 is restrained. Due to this effect, the temperature decline of the oxidant gas supplied to the lower end of each of unit cells 10 that correspond to the thermal insulation sheet 111 is restrained. As a result, the temperature of the lower ends of the unit cells 10 can be raised. Besides, since the thermal insulation sheet 111 is disposed so as to face the evaporation portion 42 but not to face the unit cells 10, heat of the upper end of the unit cells 10 is not prevented from being transferred to the oxidant gas flowing in the oxidant gas distributing channel. Therefore, it is possible to reduce the temperature of the upper end of the unit cells 10 that correspond to the thermal insulation sheet 111. Due to this effect, it becomes possible to reduce the temperature difference in the up-down direction in each of the unit cells that correspond to the thermal insulation sheet 111.

Incidentally, in the fuel cell stack 20, it suffices that the thermal insulation sheet 111 is provided for one of the two oxidant gas distributing members 100. However, the thermal insulation sheet 111 may be provided for both the oxidant gas distributing members 100, because in this construction, the temperature difference in the stack direction of the unit cells 10 can be made less. Besides, each of the oxidant gas distributing members 100 may be the oxidant gas distributing member 100 in accordance with any one of the first modification to the third modification of the first embodiment. Besides, each of the oxidant gas distributing members 100 may be the oxidant gas distributing member 100a in accordance with the second embodiment or either one of the first modification and the second modification of the second embodiment.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell module comprising:
a casing;
a fuel cell stack that is formed in the casing by stacking a plurality of unit cells that generate electricity using an oxidant gas and a fuel gas; and
an oxidant gas distributing member that is formed in the casing and disposed at a side surface, that extends in a stack direction of the unit cells, of the fuel cell stack that extends in a direction from one end to another end of each of the unit cells, and that supplies the oxidant gas for use for electricity generation of the unit cells to the another end of each unit cell after supplying the oxidant gas through the oxidant gas distributing member in the direction of the unit cells from the one end to the another end;
wherein the fuel cell stack includes two end portions in the stack direction and a remaining portion defined between the two end portions, and
the oxidant gas distributing member includes a heat exchange restraint portion provided over a predetermined region that restrains heat exchange between the unit cells and the oxidant gas in at least one of the two end portions more than the heat exchange between the remaining portion and the oxidant gas.

2. The fuel cell module according to claim 1, wherein the heat exchange restraint portion includes a flow-resistance portion that has a higher flow-resistance in at least one of the two end portions than the remaining portion.

3. The fuel cell module according to claim 2, wherein the flow-resistance portion is a first portion of the oxidant gas distributing member whose cross-sectional area is smaller than that of a second portion, which faces the remaining portion, of the oxidant gas distributing member.

4. The fuel cell module according to claim 2, wherein the flow-resistance portion is a portion of the oxidant gas distributing member in which a closure member is inserted.

5. The fuel cell module according claim 2, wherein the flow-resistance portion is formed in at least one of the end portions of the oxidant gas distributing member in the stack direction of the unit cells.

6. The fuel cell module according to claim 1, wherein the heat exchange restraint portion has a thermal insulation member that is disposed on an internal wall surface or an external wall surface of the oxidant gas distributing member.

7. The fuel cell module according to claim 6, wherein the thermal insulation member is disposed in at least one of end portions of the oxidant gas distributing member in the stacking direction of the unit cells.

8. The fuel cell module according to claim 1, further comprising a reformer that is disposed at the one end of each unit cell and that has an evaporation portion that evaporates reforming water,
wherein the evaporation portion is formed at one of end portions of the reformer in the stack direction of the unit cells, and
wherein the heat exchange restraint portion is disposed on at least one side, on which the evaporation portion is provided, of the oxidant gas distributing member.

9. The fuel cell module according to claim 8, further comprising a combustion portion that is disposed between the one end of the unit cells and the reformer, and that burns a fuel off-gas that is left unused in the electricity generation of the unit cells using an oxidant off-gas that is left unused in the electricity generation of the unit cells.

* * * * *